United States Patent
Wang et al.

(10) Patent No.: US 10,034,249 B2
(45) Date of Patent: Jul. 24, 2018

(54) POWER CONTROL METHOD AND DEVICE, AND BASE STATION

(71) Applicant: ZTE Corporation, Shenzhen (CN)

(72) Inventors: Meiying Wang, Shenzhen (CN); Tao Liu, Shenzhen (CN); Can Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 101 days.

(21) Appl. No.: 15/031,012

(22) PCT Filed: May 29, 2014

(86) PCT No.: PCT/CN2014/078838
§ 371 (c)(1),
(2) Date: Apr. 21, 2016

(87) PCT Pub. No.: WO2014/187385
PCT Pub. Date: Nov. 27, 2014

(65) Prior Publication Data
US 2016/0278025 A1 Sep. 22, 2016

(30) Foreign Application Priority Data
Oct. 21, 2013 (CN) .......................... 2013 1 0495821

(51) Int. Cl.
*H04W 52/32* (2009.01)
*H04L 1/18* (2006.01)
(Continued)

(52) U.S. Cl.
CPC ......... *H04W 52/325* (2013.01); *H04L 1/1812* (2013.01); *H04W 52/0235* (2013.01);
(Continued)

(58) Field of Classification Search
CPC .... H04L 1/1812; H04L 1/1822; H04W 28/22; H04W 52/146; H04W 52/367
See application file for complete search history.

(56) References Cited

U.S. PATENT DOCUMENTS

2012/0250521 A1* 10/2012 Marinier ............. H04W 72/082
370/241

FOREIGN PATENT DOCUMENTS

| CN | 102447550 A | 5/2012 |
| CN | 103081541 A | 5/2013 |

(Continued)

OTHER PUBLICATIONS

International Search Report for corresponding application No. PCT/CN2014/078838 filed on May 29, 2014; dated Sep. 16, 2014.
(Continued)

*Primary Examiner* — Chandrahas B Patel
(74) *Attorney, Agent, or Firm* — Cantor Colburn LLP

(57) ABSTRACT

A method and device for controlling power, and a base station are provided. The method includes: when the service type of User Equipment (UE) is a pre-designated service type, acquiring a Hybrid Automatic Repeat Request (HARQ) process activation/deactivation flag of the UE; and in a deactivated HARQ process corresponding to the HARQ process deactivation flag of the UE, adjusting at least one of the power control related parameters, so as to reduce the transmit power of the UE. Through the embodiment of the present disclosure, when a certain HARQ process is deactivated, the base station can notify the UE to reduce the transmit power, so as to reduce the uplink interference, thereby increasing the uplink capacity of system, reducing unnecessary power waste and prolonging the standby time of the UE.

9 Claims, 2 Drawing Sheets

(51) Int. Cl.
*H04W 52/02* (2009.01)
*H04W 52/14* (2009.01)
*H04W 52/28* (2009.01)
*H04W 52/24* (2009.01)
*H04W 72/04* (2009.01)
*H04W 72/08* (2009.01)

(52) U.S. Cl.
CPC ....... *H04W 52/146* (2013.01); *H04W 52/241* (2013.01); *H04W 52/286* (2013.01); *H04W 52/287* (2013.01); *H04W 72/0413* (2013.01); *H04W 72/0473* (2013.01); *H04W 72/082* (2013.01); *Y02D 70/00* (2018.01); *Y02D 70/1242* (2018.01); *Y02D 70/1246* (2018.01)

(56) References Cited

FOREIGN PATENT DOCUMENTS

| | | |
|---|---|---|
| EP | 2144379 A1 | 1/2010 |
| EP | 2642799 A2 | 9/2013 |
| WO | 2012135795 A1 | 10/2012 |

OTHER PUBLICATIONS

EP Search Report dated Sep. 20, 2016 re: Application No. 14800791.7-1855 / 3062565 PCT/CN2014/078838; pp. 1-7.
Examination Communication dated Nov. 3, 2017 re: Application No. 14 800 791.7-1875; pp. 1-5.

* cited by examiner

POWER CONTROL METHOD AND DEVICE, AND BASE STATION

TECHNICAL FIELD

The present disclosure relates to the technical field of mobile telecommunications, and in particular to a power control method, a power control device and a base station.

BACKGROUND

Uplink dedicated physical channels for High Speed Uplink Packet Access (HSUPA) services in a Universal Mobile Telecommunications System (UMTS) include: Dedicated Physical Control Channel (DPCCH), which mainly provides control information, such as pilot and Transmission Power Control (TPC), Transmission Format Combination Indication (TFCI) and Feedback Information (FBI); E-DCH Dedicated Physical Control Channel (E-DP-CCH), which mainly transmits the control part of HSUPA services; and E-DCH Dedicated Physical Data Channel (E-DPDCH), which mainly transmits the data part of HSUPA services.

According to the regulations of the 3rd Generation Partnership Project (3GPP) protocol, when a terminal transmits uplink data on the E-DPDCH, the E-DPCCH and DPCCH will transmit data along with the E-DPDCH; while, when the terminal has no data transmitted on the E-DPDCH, the E-DPCCH does not transmit data, but the DPCCH still continues to transmit data, which will cause extra interference, reduce the system capacity of uplink and reduce the standby time of the terminal.

SUMMARY

In view of the above problems, the embodiment of the present disclosure provides a power control method, a power control device and a base station, which can overcome the above problems or at least solve part of the above problems, and can effectively control User Equipment (UE) to reduce the transmit power.

According to an embodiment of the present disclosure, a method for controlling power is provided, including: when the service type of a UE is a pre-designated service type, acquiring a Hybrid Automatic Repeat Request (HARQ) process activation/deactivation flag of the UE; and in a deactivated HARQ process corresponding to the HARQ process deactivation flag of the UE, adjusting at least one of the power control related parameters, so as to reduce the transmit power of the UE.

Optionally, the method further includes: in an activated HARQ process corresponding to the HARQ process activation flag of the UE, recovering the power control related parameter, and controlling the transmit power of the UE using an existing power control manner.

Optionally, the step of adjusting at least one of the power control related parameters so as to reduce the transmit power of the UE includes: according to a predefined adjustment amount for a target Signal to Interference Ratio (SIR), adjusting the target SIR of the UE in the deactivated HARQ process, to obtain an adjusted target SIR of the UE in the deactivated HARQ process; in the deactivated HARQ process of the UE, performing power control according to the adjusted target SIR of the UE in the deactivated HARQ process, so as to reduce the transmit power of the UE.

Optionally, the step of adjusting at least one of the power control related parameters so as to reduce the transmit power of the UE further includes: according to a predefined power control flag, adjusting the power control flag of the UE in the deactivated HARQ process; in the deactivated HARQ process of the UE, performing power control according to the adjusted power control flag of the UE in the deactivated HARQ process, so as to reduce the transmit power of the UE.

Optionally, before the step of acquiring a HARQ process activation/deactivation flag of a UE when the service type of the UE is a pre-designated service type, the method further includes: identifying the service type of the UE.

According to another embodiment of the present disclosure, a device for controlling power is provided, including: an acquisition module, which is configured to acquire an HARQ process activation/deactivation flag of a UE when the service type of the UE is a pre-designated service type; and a first power adjustment module, which is configured to adjust at least one of the power control related parameters in a deactivated HARQ process corresponding to the HARQ process deactivation flag of the UE, so as to reduce the transmit power of the UE.

Optionally, the device further includes: a second power adjustment module, which is configured to recover the power control related parameter in an activated HARQ process corresponding to the HARQ process activation flag of the UE, and to control the transmit power of the UE using an existing power control manner.

Optionally, the first power adjustment module includes: a target SIR adjustment unit, which is configured to adjust the target SIR of the UE in the deactivated HARQ process according to a predefined adjustment amount for the target SIR, to obtain an adjusted target SIR of the UE in the deactivated HARQ process; a first power adjustment unit, which is configured to perform power control in the deactivated HARQ process of the UE according to the adjusted target SIR of the UE in the deactivated HARQ process, so as to reduce the transmit power of the UE.

Optionally, the first power adjustment module further includes: a power control flag adjustment unit, which is configured to adjust the power control flag of the UE in the deactivated HARQ process according to a predefined power control flag; a second power adjustment unit, which is configured to perform power control in the deactivated HARQ process of the UE according to the adjusted power control flag of the UE in the deactivated HARQ process, so as to reduce the transmit power of the UE.

According to another embodiment of the present disclosure, a base station is provided, which includes a device for controlling power as described above.

From the above technical scheme it can be known that the embodiment of the present disclosure has following advantages: when the service type of a UE is a pre-designated service type, an HARQ process activation/deactivation flag of the UE is acquired; and in a deactivated HARQ process corresponding to the HARQ process deactivation flag of the UE, at least one of the power control related parameters is adjusted, so as to reduce the transmit power of the UE; therefore, when a certain HARQ process is deactivated, the base station can notify the UE to reduce the transmit power, so as to reduce the uplink interference, thereby increasing the uplink capacity of system, reducing unnecessary power waste and prolonging the standby time of the UE.

BRIEF DESCRIPTION OF THE DRAWINGS

Through the detailed description of preferred implementations below, various other advantages and benefits become clearer for the ordinary staff in the field. Accompanying drawings provided below are only for the purpose of illustrating the preferred implementations but a limit to the present disclosure. In all the accompanying drawings, same symbols represent the same parts. In the accompanying drawings.

DETAILED DESCRIPTION OF THE EMBODIMENTS

Exemplary embodiments of the present disclosure are described below in further detail by reference to accompanying drawings. Although the exemplary embodiments of the present disclosure are displayed in accompanying drawings, it should be understood that the present disclosure can be implemented in various forms but limited by the embodiments illustrated below. Instead, these embodiments are provided for the purpose of thoroughly understanding of the present disclosure and complete conveying of the scope of the present disclosure to those skilled in the art.

It should be understood that those skilled in the art can think up various structures that are not described or recorded in the description but can implement the present disclosure and fall into the scope of the spirit, principle and scope of the present disclosure.

All examples and conditional sentences cited in the description are for the purpose of description and instruction, so as to help readers understand the principles and concepts on which the contribution made by the inventor is based, and it should be understood that the present disclosure is not limited to these specific examples and conditions.

In addition, the principle, various aspects cited in the description and all descriptions and illustrations of each embodiment and specific examples thereof are intended to cover the equivalents in structure and function. These equivalents shall contain currently kwon or future developed equivalents, that is, developmental achievements executing the same function irregardless to structures.

Those skilled in the art should understand that block diagrams shown in accompanying drawings represent the structure of the present disclosure or the schematic diagram of circuits. Likewise, any flowcharts shown in accompanying drawings represent various processes that actually can be executed by various computers or Central Processing Units (CPUs), no matter whether the computer or CPU is displayed in the accompanying drawings.

In claims, modules used to execute a specified function are intended to cover any way executing this function, including: for example, (a) combination of circuit components executing this function, or (b) any form of software, and thus including firmware, microcode and the like, which are combined with proper circuits to execute the software implementing the function. Functions provided by various modules are combined by a way required by claims; therefore, it should be considered that any module, component or elements capable of providing these functions are equal to the modules limited in claims.

The term "Embodiment" referred in the description means that specific features, structures and the like described in conjunction with this embodiment are contained in at least one embodiment of the present disclosure; therefore, the term "in the embodiment" appearing in different parts of the description does not necessarily mean the same embodiment.

First Embodiment

Figure 1:
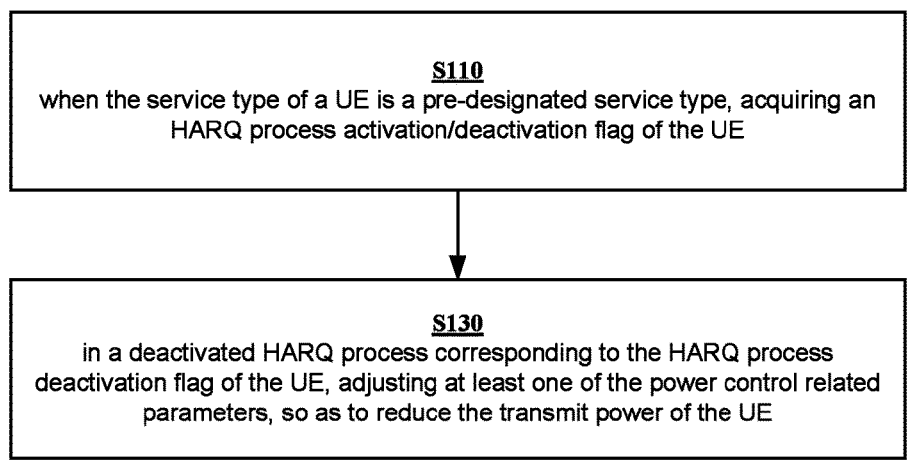
FIG. 1 is a flowchart of a method for controlling power 100 according to the embodiment of the present disclosure.

FIG. 1 is a flowchart of a method for controlling power 100 according to the embodiment of the present disclosure; the method 100 includes: S110 and S130; the method 100 starts from S110, wherein when the service type of a UE is a pre-designated service type, an HARQ process activation/deactivation flag of the UE is acquired.

Optionally, in the embodiment of the present disclosure, the pre-designated service type might be HSUPA 2 ms Transmission Time Interval (TTI); of course, it can be understood that specific types for the pre-designated service type are not limited in the embodiment of the present disclosure.

Subsequently, in S130, in a deactivated HARQ process corresponding to the HARQ process deactivation flag of the UE, at least one of the power control related parameters is adjusted, so as to reduce the transmit power of the UE.

Optionally, in the embodiment of the present disclosure, S130 specifically includes: according to a predefined adjustment amount for a target SIR, adjusting the target SIR of the UE in the deactivated HARQ process, to obtain an adjusted target SIR of the UE in the deactivated HARQ process; then, in the deactivated HARQ process of the UE, performing power control according to the adjusted target SIR of the UE in the deactivated HARQ process, so as to reduce the transmit power of the UE.

Optionally, in the embodiment of the present disclosure, S130 further includes: according to a predefined power control flag, adjusting the power control flag of the UE in the deactivated HARQ process; in the deactivated HARQ process of the UE, performing power control according to the adjusted power control flag of the UE, so as to reduce the transmit power of the UE.

According to the embodiment of the present disclosure, the method for controlling power 100 might further include one or more optional steps, to realize extra or additional functions; however, these optional steps are not indispensable to realize the purpose of the present disclosure; the method for controlling power 100 according to the embodiment of the present disclosure can realize the purpose of the present disclosure entirely without these optional steps. These optional steps are not shown in FIG. 1, however the execution order of them can be easily obtained by those skilled in the art according to the following instruction. It should be noted that the execution order of these optional steps together with that of the above steps can be selected as actually needed if without special request.

Optionally, in the embodiment of the present disclosure, after S110, the method 100 further includes: in an activated HARQ process corresponding to the HARQ process activation flag of the UE, recovering the power control related parameter, and controlling the transmit power of the UE using an existing power control manner.

Optionally, in the embodiment of the present disclosure, before S110, the method 100 further includes: identifying the service type of the UE; of course, it can be understood that specific ways to identify the service type of the UE are not limited in the embodiment of the present disclosure.

The embodiment of the present disclosure is introduced below through the embodiment of performing power control based on HARQ process activation/deactivation in an HSUPA system.

For a UE with the service type of HSUPA 2 ms TTI, it is regulated by protocol that data is transmitted by 8 HARQ processes. A NodeB can activate/deactivate any one HARQ process; when a certain HARQ process is deactivated, this HARQ process can not be used to transmit data; therefore, the NodeB can learn in which HARQ process the UE with the service type of HSUPA 2 ms TTI is deactivated; in the deactivated HARQ process, E-DPCCH and E-DPDCH will turn off transmitting, however DPCCH still transmits data. The NodeB can reduce the transmit power of the UE in the deactivated HARQ process, so as to reduce the uplink interference, thereby increasing the uplink capacity of system, reducing unnecessary power waste and prolonging the standby time of the UE.

Supposing there is at least one UE with the service type of HSUPA 2 ms TTI, a NodeB notifies the UE, through initial Radio Resource Control (RRC) signalling and following E-DCH Absolute Grant Channel (E-AGCH) signalling, that the number of the activated HARQ process is $\{0, 1, 6, 7\}$ and the number of the deactivated HARQ process is $\{2, 3, 4, 5\}$.

S210: the NodeB identifies the service type of the UE.

S230: when the service type of the UE is a pre-designated service type, the NodeB acquires an HARQ process activation/deactivation flag of the UE.

Optionally, in the embodiment of the present disclosure, the pre-designated service type is HSUPA 2 ms TTI; of course, it is understandable that in the embodiment of the present disclosure the service type is not limited to the pre-designated service type; the implementation of other service types is similar to that in the embodiment of the present disclosure, and no further description is needed here.

Optionally, in S230, first the NodeB transmits, to an RNC, a designated HARQ process number that can be used to transmit dispatch data, through a NodeB Application Part (NBAP) message; then, the RNC transmits an RRC layer message to notify the UE. Thus, the NodeB can determine the initial HARQ process activation/deactivation flag of the UE with the service type of HSUPA 2 ms TTI; then the NodeB updates the HARQ process activation/deactivation flag of the UE according to the activation/deactivation E-AGCH command sent in the following process to the UE with the service type of HSUPA 2 ms TTI. Finally, it is obtained that the HARQ process activation/deactivation flag of the UE is 11000011, that is, 8 binary bits are used to respectively represent a corresponding HARQ process activation flag or HARQ process deactivation flag, the top digit represents the HARQ process 0, wherein 1 indicates that the corresponding HARQ process is activated while 0 indicates that the corresponding HARQ process is deactivated.

S250: in a process corresponding to the HARQ process deactivation flag of the UE, the NodeB adjusts at least one of the power control related parameters, so as to reduce the transmit power of the UE.

According to the HARQ process activation/deactivation flag acquired in S230, the NodeB identifies the deactivated HARQ process and activated HARQ process of the UE. In the deactivated HARQ processes with the process number of $\{2, 3, 4, 5\}$, that is, in the processes corresponding to the HARQ process deactivation flag of the UE, the NodeB adjusts at least one of the power control related parameters, so as to reduce the transmit power of the UE; in the activated HARQ processes with the process number of $\{0, 1, 6, 7\}$, that is, in the processes corresponding to the HARQ process activation flag of the UE, the NodeB recovers the power control related parameter to use the existing power control.

In the following embodiment illustrating the present disclosure, a NodeB reduces the transmit power of a UE in a deactivated HARQ process by adjusting a target SIR value.

Figure 2:
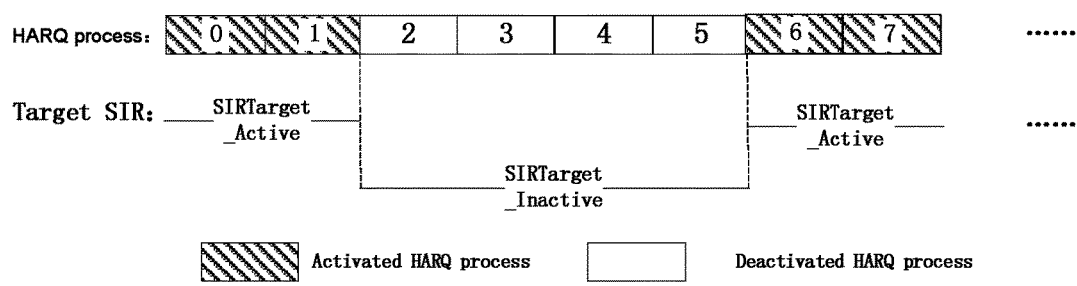
FIG. 2 is a diagram of a NodeB reducing the transmit power of a UE in a deactivated HARQ process by adjusting a target SIR according to the embodiment of the present disclosure.

As shown in FIG. 2, supposing the UE has a target SIR value of SIRTarget_Active in an activated HARQ process, in the slot head of the deactivated HARQ process 2 the NodeB reduces the target SIR value of the UE by DeltaSir_Down to obtain a reduced SIRTarget_Inactive, SIRTarget_Inactive=SIRTarget_Active−DeltaSir_Down, where DeltaSir_Down is an empirical value or a test value; in the slot head of the activated HARQ process 6, the NodeB resets the target SIR value of the UE to SIRTarget_Active.

In the activated HARQ process, the NodeB performs inner loop power control according to the SIRTarget_Active; in the deactivated HARQ process, the NodeB performs inner loop power control according to the SIRTarget_Inactive.

The following embodiment illustrates the process of a NodeB reducing the transmit power of a UE in a deactivated HARQ process by adjusting a power control flag.

Figure 3:
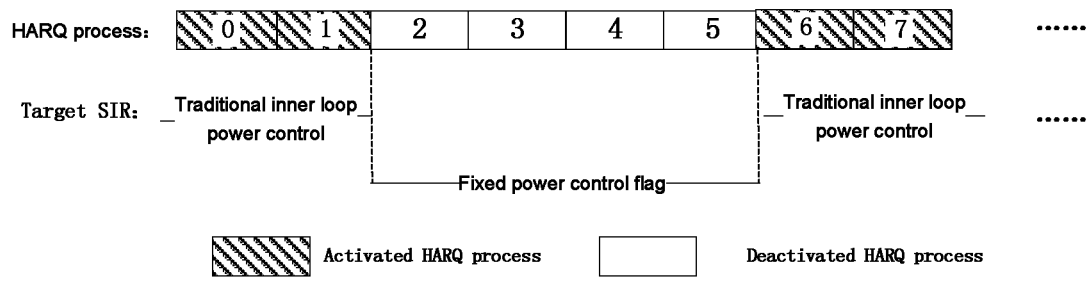
FIG. 3 is a diagram of a NodeB reducing the transmit power of a UE in a deactivated HARQ process by adjusting a power control flag according to the embodiment of the present disclosure.

As shown in FIG. 3, in the activated HARQ processes with the process number of $\{0, 1\}$, the NodeB controls the transmit power of the UE through an existing inner loop power control manner, that is, the NodeB measures the SIR of the uplink DPCCH in real time, and compares it with a target SIR value (SIRtarget); if the SIR measured in real time is less than SIRtarget, the NodeB transmits to the UE a power control indication used for increasing the transmit power; if the SIR measured in real time is greater than SIRtarget, the NodeB transmits to the UE a power control indication used for reducing the transmit power. In the deactivated HARQ processed with the process number of $\{2, 3, 4, 5\}$, the NodeB adjusts the power control flag generated by the existing power control manner; the NodeB first transmits n1 power control indications to notify the UE to reduce the transmit power, and then transmits n2 power control indications to notify the UE to improve the transmit power, that is, to change the random power control flag (011110100) generated by the existing power control manner into a fixed power control flag (0102 . . . 0n11112 . . . 1n2), so as to reduce the transmit power of the UE, and recovers the existing inner loop power control manner in the activated HARQ processes with the process number of $\{6, 7\}$.

In the power control flag, 0 indicates the UE is required to reduce the transmit power, 1 indicates that the UE is required to improve the transmit power; the values of n1 and n2 are related to the number of deactivated HARQ processes, supposing there are m consecutive deactivated HARQ processes, then $$n_1 = \left\lceil \frac{m \times 3}{2} \right\rceil,$$

$$n_2 = \left\lceil \frac{m \times 3}{2} \right\rceil.$$

According to the second embodiment of the present disclosure, the present disclosure further provides a device for controlling power 400, which corresponds to the above method for controlling power 100 according to the embodiment of the present disclosure.

Figure 4:
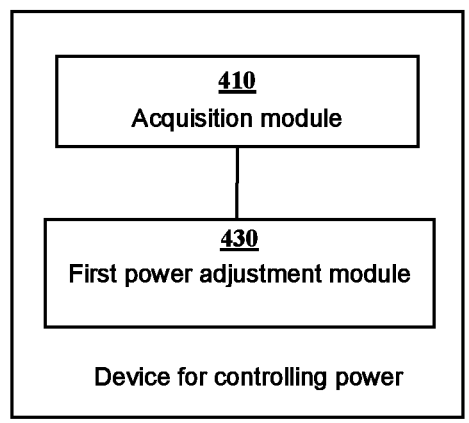
FIG. 4 is a structure diagram of a device for controlling power 400 according to the embodiment of the present disclosure.

As shown in FIG. 4, the device for controlling power 400 according to the embodiment of the present disclosure might further include: an acquisition module 410 and a first power adjustment module 430. It should be understood that connection relationships between each module shown in FIG. 4 are only for example; those skilled in the art can adopt other connection relationship totally, only if all modules can implement the function of the present disclosure in these connection relationships.

In this description, the function of each module can be realized by special hardware or the hardware that can be combined with proper software to execute processing. This kind of hardware or the special hardware might include Application Specific Integrated Circuit (ASIC), various other circuits, various CPUs and the like. When realized by a CPU, the function can be provided by a single special CPU, a single shared CPU or multiple independent CPUs (in which some might be shared). In addition, CPU should not be understood as specially referring to the hardware capable of executing software, it might implicitly include but not limited to Digital Signal Processor (DSP) hardware, Read Only Memory (EROM) for storing software, Random Access Memory (RAM) and non-volatile memory.

In the embodiment of the present disclosure, the acquisition module 410 is configured to acquire an HARQ process activation/deactivation flag of a UE when the service type of the UE is a pre-designated service type.

In the embodiment of the present disclosure, the first power adjustment module 430 is configured to adjust at least one of the power control related parameters in a deactivated HARQ process corresponding to the HARQ process deactivation flag of the UE, so as to reduce the transmit power of the UE Optionally, in the embodiment of the present disclosure, the first power adjustment module 430 includes: a target SIR adjustment unit and a first power adjustment unit, wherein the target SIR adjustment unit is configured to adjust the target SIR of the UE in the deactivated HARQ process according to a predefined adjustment amount for the target SIR, to obtain an adjusted target SIR of the UE in the deactivated HARQ process; the first power adjustment unit is configured to perform power control in the deactivated HARQ process of the UE according to the adjusted target SIR of the UE in the deactivated HARQ process, so as to reduce the transmit power of the UE.

Optionally, in the embodiment of the present disclosure, the first power adjustment module 430 further includes: a power control flag adjustment unit, which is configured to adjust the power control flag of the UE in the deactivated HARQ process according to a predefined power control flag; a second power adjustment unit, which is configured to perform power control in the deactivated HARQ process of the UE according to the adjusted power control flag of the UE in the deactivated HARQ process, so as to reduce the transmit power of the UE.

According to the embodiment of the present disclosure, the device for controlling power 400 might further include one or more optional modules, to realize extra or additional functions; however, these optional modules are not indispensable to realize the purpose of the present disclosure; the device for controlling power 400 according to the embodiment of the present disclosure can realize the purpose of the present disclosure entirely without these optional modules. These optional modules are not shown in FIG. 4, however, the connection relationship between them and the above modules can be easily obtained by those skilled in the art according to the following instruction.

Optionally, in the embodiment of the present disclosure, the device 400 further includes: a second power adjustment module, which is configured to recover the power control related parameter in an activated HARQ process corresponding to the HARQ process activation flag of the UE, and to control the transmit power of the UE using an existing power control manner.

Optionally, in the embodiment of the present disclosure, the device 400 further includes: an identification module, which is connected with the acquisition module 410 and is configured to identify the service type of the UE.

According to the third embodiment of the present disclosure, a base station is provided, which includes a device for controlling power according to the embodiment of the present disclosure as described above; when a certain HARQ process is deactivated, the base station can notify the UE to reduce the transmit power, so as to reduce the uplink interference, thereby increasing the uplink capacity of system, reducing unnecessary power waste and prolonging the standby time of the UE.

Since the above method embodiments are corresponding to the above device embodiments, there is no need to describe the method embodiment in detail.

In this description, lots of specific details are provided. However, it should be understood that the embodiment of the present disclosure can be implemented without these specific details. In some embodiments, the well known methods, structures and technologies are not illustrated in detail, so as not to make readers confuse them with the principle of this description.

Those skilled in the art should understand that the modules contained in the device in each embodiment can be modified adaptively and set in one or more devices different from this embodiment. Several modules in the embodiment can be combined into a module or unit or component, or can be split into multiple sub-modules or sub-units or sub-components. Except the condition that features and/or processes are mutually conflicted, any combination can be adopted to all the steps in any method or all modules in any device published in this description. Unless otherwise specified, each feature disclosed in this description can be replaced by a substitute feature providing the same, equivalent or similar purpose.

Each device embodiment of the present disclosure can be realized by hardware, or a software module running on one or more CPUs or a combination there of. Those skilled in the art should understand that a microprocessor or DSP can be used to realize part or all functions of some or all modules in the device according to the embodiment of the present disclosure. The present disclosure also can be realized as a device program for executing the method described above (for example, computer program or computer program product).

It should be noted that the above embodiment are to describe the present disclosure but to limit the present disclosure and that those skilled in the art can design out various substitute embodiments without departing from the scope of the claims appended below. In the claims, the ordering of the features does not necessarily mean any particular ordering of the features; moreover, the order of each step in the method claims does not necessarily mean that these steps must be executed in accordance with this order. In stead, these steps can be executed in any proper order. Likewise, the processing order of each module in the device claims shall not be limited by the sort of each module in the claims, but can be any proper processing order. In the claims, any reference mark in brackets shall not be understood as a limit to the claims. Term "comprise" or "contain" does not exclude the existence of modules or steps that are not listed in the claims. Term "one" or "a/an" located before module or step does not exclude the existence of multiple same modules or steps. The present disclosure can be realized by means of the hardware including umpty different modules or a properly programmed computer or CPU. In the device claims listing umpty modules, several of these modules can be realized by the same hardware. Terms "first", "second", "third" and the like do not represent any order, which can be explained as names. Terms "connect", "couple" and the like, when used in this description, are defined as operable connections performed in any desired forms, for example, mechanically, electrically, digitally, simulated, directly, indirectly, through software, through hardware and other ways.

INDUSTRIAL APPLICABILITY

The above technical scheme provided by the present disclosure is applicable to a power control process. When the service type of a UE is a pre-designated service type, an HARQ process activation/deactivation flag of the UE is acquired; and in a deactivated HARQ process corresponding to the HARQ process deactivation flag of the UE, at least one of the power control related parameters is adjusted, so as to reduce the transmit power of the UE; therefore, when a certain HARQ process is deactivated, the base station can notify the UE to reduce the transmit power, so as to reduce the uplink interference, thereby increasing the uplink capacity of system, reducing unnecessary power waste and prolonging the standby time of the UE.

What is claimed is:

1. A method for controlling power, comprising:
  when the service type of User Equipment (UE) is a pre-designated service type, acquiring a Hybrid Automatic Repeat Request (HARQ) process activation/deactivation flag of the UE; and
  in a deactivated HARQ process corresponding to the HARQ process deactivation flag of the UE, adjusting at least one of the power control related parameters, so as to reduce the transmit power of the UE,
  wherein the step of adjusting at least one of the power control related parameters so as to reduce the transmit power of the UE comprises:
  adjusting a target Signal Interference Radio (SIR) of the UE in the deactivated HARQ process according to a predefined adjustment amount for the target SIR, to obtain an adjusted target SIR of the UE in the deactivated HARQ process;
  in the deactivated HARQ process of the UE, preforming power control according to the adjusted target SIR of the UE in the deactivated HARQ process, so as to reduce the transmit power of the UE.

2. The method according to claim 1, further comprising:
  in an activated HARQ process corresponding to the HARQ process activation flag of the UE, recovering the power control related parameter, and controlling the transmit power of the UE using an existing power control manner.

3. The method according to claim 1, wherein before the step of acquiring a HARQ process activation/deactivation flag of a UE when the service type of the UE is a pre-designated service type, the method further comprises:
  identifying the service type of the UE.

4. A device for controlling power, comprising:
  an acquisition module, which is configured to acquire a Hybrid Automatic Repeat Request (HARQ) process activation/deactivation flag of User Equipment (UE) when the service type of the UE is a pre-designated service type; and
  a first power adjustment module, which is configured to adjust at least one of the power control related parameters in a deactivated HARQ process corresponding to the HARQ process deactivation flag of the UE, so as to reduce the transmit power of the UE;
  wherein the first power adjustment module comprises:
  a target Signal Interference Radio (SIR) adjustment unit, which is configured to adjust the target SIR of the UE in the deactivated HARQ process according to a predefined adjustment amount for the target SIR, to obtain an adjusted target SIR of the UE in the deactivated HARQ process;
  a first power adjustment unit, which is configured to perform power control in the deactivated HARQ process of the UE according to the adjusted target SIR of the UE in the deactivated HARQ process, so as to reduce the transmit power of the UE.

5. The device according to claim 4, further comprising:
  a second power adjustment module, which is configured to recover the power control related parameter in an activated HARQ process corresponding to the HARQ process activation flag of the UE, and to control the transmit power of the UE using an existing power control manner.

6. The device according to claim 4, further comprising:
  an identification module, which is connected with the acquisition module and is configured to identify the service type of the UE.

7. A base station, comprising a device for controlling power, wherein the device for controlling power comprises:
  an acquisition module, which is configured to acquire a Hybrid Automatic Repeat Request (HARQ) process activation/deactivation flag of User Equipment (UE) when the service type of the UE is a pre-designated service type; and
  a first power adjustment module, which is configured to adjust at least one of the power control related parameters in a deactivated HARQ process corresponding to the HARQ process deactivation flag of the UE, so as to reduce the transmit power of the UE;
  wherein the first power adjustment module comprises:
  a target Signal Interference Radio (SIR) adjustment unit, which is configured to adjust the target SIR of the UE in the deactivated HARQ process according to a predefined adjustment amount for the target SIR, to obtain an adjusted target SIR of the UE in the deactivated HARQ process;
  a first power adjustment unit, which is configured to perform power control in the deactivated HARQ process of the UE according to the adjusted target SIR of the UE in the deactivated HARQ process, so as to reduce the transmit power of the UE.

8. The base station according to claim 7, the device for controlling power further comprises:
  a second power adjustment module, which is configured to recover the power control related parameter in an activated HARQ process corresponding to the HARQ process activation flag of the UE, and to control the transmit power of the UE using an existing power control manner.

9. The base station according to claim 7, the device for controlling power further comprises:
   an identification module, which is connected with the acquisition module and is configured to identify the service type of the UE.

* * * * *